July 24, 1956 J. P. LARSEN 2,755,769
MILKING MACHINE VALVES

Filed Dec. 1, 1952 2 Sheets-Sheet 1

Inventor.
Johannes Peter Larsen

Inventor.
Johannes Peter Larsen

United States Patent Office 2,755,769
Patented July 24, 1956

2,755,769

MILKING MACHINE VALVES

Johannes Peter Larsen, Copenhagen, Denmark

Application December 1, 1952, Serial No. 323,373

Claims priority, application Denmark November 30, 1951

10 Claims. (Cl. 119—14.46)

This invention relates to a milking machine of the type which includes a milk container communicating with a vacuum pump through a vacuum hose, and a suction passageway from the container to the vacuum hose and with a one-way valve in the said suction passageway.

It is an object of the invention to provide a device in which the valve member of said one-way valve must be in its place during milking.

Another object is to provide a device in which a very efficient tightening is obtained in the one-way valve by employing a valve member of resilient material guided so that it cannot slide upon the valve seat.

A further object is to provide a seat member which may be cleansed by wiping instead of the usual cleaning of the valve orifice by means of a brush.

It is also an object of the invention to provide a narrow portion in the suction passageway in order to prevent excessive inflow of air if a teat cup falls off a teat.

A still further object of the invention is to provide a device for replacing the usual Y-connection employed where the pulsator and the suction passageway are spaced.

It is also an object of the invention to provide a valve having a great operating diameter to obtain a short movement of the valve member, and accordingly, quick closing of the valve.

A further object is to provide a valve having a spring operated valve member so that the valve member may have very little weight and consequently will move quickly. Furthermore the valve will remain closed in any position in relation to the horizontal plane.

Figure 1:
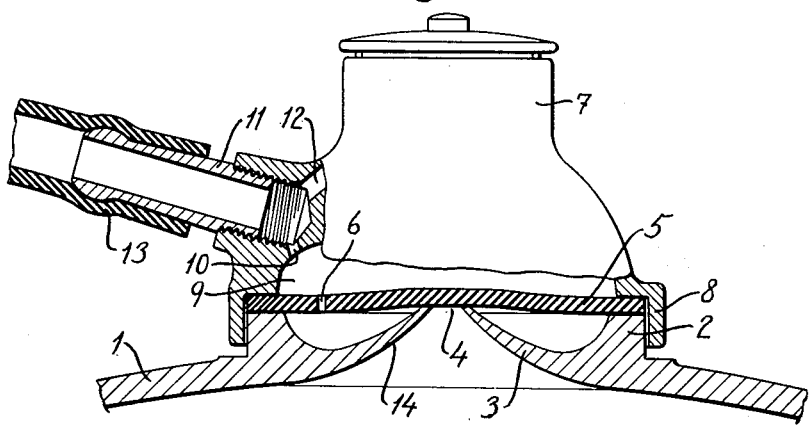
Figure 2:
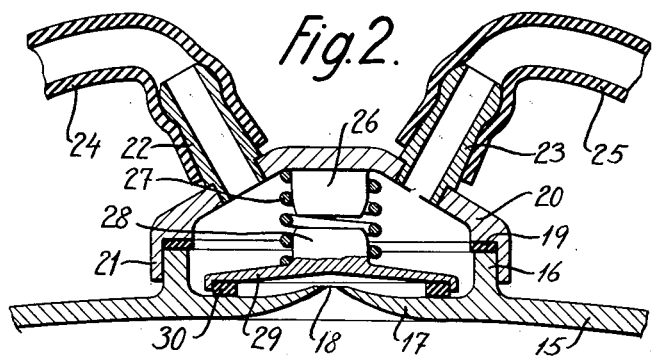
Figure 3:
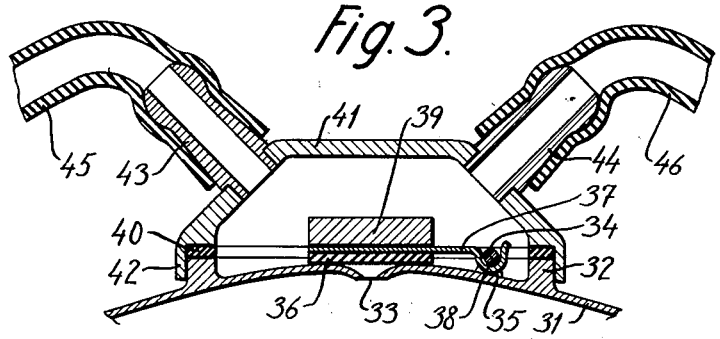
Figure 4:
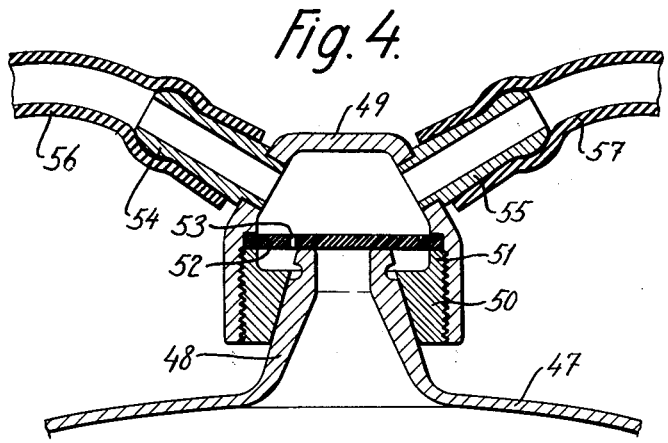
Figure 5:
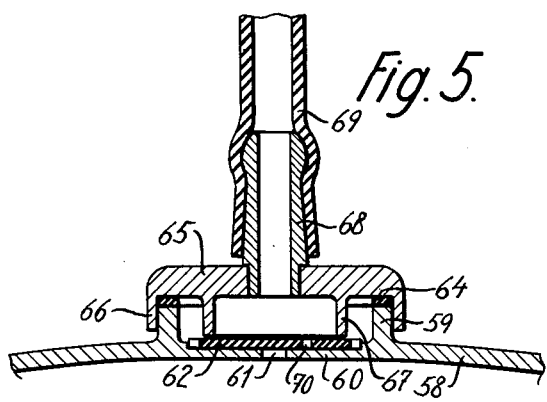
Figure 6:
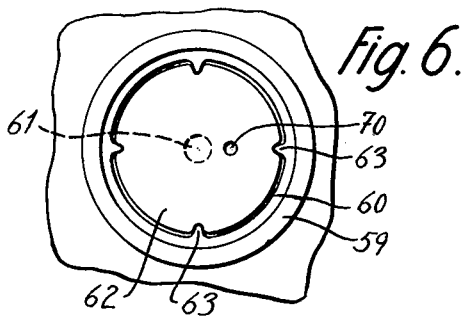

These and further objects will be evident from the following description taken in conjunction with the accompanying drawing in which Fig. 1 shows a portion of a cover for a milking machine pail, a pulsator disposed upon the cover and a one-way valve of a first embodiment, seen partly in side elevation and partly in vertical section, Fig. 2 is a vertical sectional view of a portion of a cover, a housing disposed upon the cover and provided with two hose nipples, and a one-way valve of a second embodiment, Fig. 3 is a vertical sectional view of a portion of a cover, a housing disposed upon the cover and a one-way valve of a third embodiment, Fig. 4 is a vertical sectional view of a portion of a cover provided with a conical projection, a housing disposed upon the projection, and a one-way valve of a fourth embodiment, Fig. 5 a vertical view of a portion of a cover, a housing disposed upon the cover, and a one-way valve of a fifth embodiment, and Fig. 6 a plan view of the cover of Fig. 5 with a valve disc, the housing being omitted.

In Fig. 1 the numeral 1 designates a cover of the milk container of a milking machine. The cover may for instance be of cast metal and is provided with a circular and upwardly projecting annular portion 2, and within this a web 3 projects inwards. The thickness of the web 3 decreases inwards, and the web is curved upwards to an inner edge defining a central orifice 4. Upon the plane topside of the portion 2 is disposed a rubber disc 5 provided with an aperture 6 having a diameter of 2 or 3 millimeters. A pulsator 7 is provided with an annular supporting face engaging a margin portion of the disc 5 and a downwardly extending flange 8. Above the disc 5 the pulsator is provided with a cavity 9 communicating through a bore 10 with a nipple 11, which nipple communicates with the pulsating device, not shown, through a bore 12. On nipple 11 is fastened the one end of a vacuum hose 13 communicating with a vacuum pump, not shown.

At the edge of orifice 4 the web 3 is provided with a narrow horizontal supporting face for the disc 5. This supporting face is situated about 1 millimeter above the top side of the portion 2 causing the disc to curve a little upwards. The horizontal supporting face meets sharply with the underside 14 of the web 3.

When the device is to be used the cover 1 is applied to a milk container, not shown, and communication between the hose 13 and the vacuum pump is established causing air to flow from the cavity of the container below cover 1, through orifice 4, along disc 5, through aperture 6, bore 10, nipple 11 and hose 13, and the disc 5 acts as a one-way valve, which is open, when the pressure below the disc is suitably higher than the pressure above it, thus lifting the disc. On account of the slight curvature, the disc has a slight pre-tension so that during use the vacuum above the disc will always be a little higher than in the container cavity, for instance 20 millimeters Hg. The cooperation of the rubber surface of the disc 5 and the horizontal supporting face of metal around the orifice 4 ensures an efficient tightening. The rubber material is guided in its movement in relation to the metal surface so that it will not slide upon the metal surface and will accordingly last a long time. The closing-time of the valve is very short. The valve member must be in place during milking since the disc 5 acts as a valve member and as a gasket. The underside 14 and the topside of web 3 may be cleaned by wiping, and it is not necessary to pass a brush through the orifice 4. The valve has slight vertical dimensions.

In Fig. 2 a cover 15 has an annular upwardly projecting flange 16 and within that a web 17 having inwardly decreasing thickness and curved a little upwards and inwards. The inner edge of the web defines a central orifice 18 having a small diameter, for instance 3 millimeters. The underside and the topside of web 17 adjoin each other sharply at the edge of the orifice. Upon the horizontal topside of flange 16 is disposed an annular rubber gasket 19, and upon that is disposed a supporting face of a housing 20, which is provided with a downwardly extending flange 21 enclosing the flange 16. The housing is provided with two hose nipples 22 and 23 for hoses 24 and 25, one of which communicates with a vacuum pump and the other with a pulsator. The housing 20 is provided with a downwardly extending interior projection 26, and upon this is fastened the one end of a helical spring 27 having its other end fastened upon a projection 28 of a cup-shaped metal part 29. On the edge of this part 29 is fastened a rubber ring 30.

During use air flows from the cavity of the milk container below the cover 15 through orifice 18, between web 17, part 29 and ring 30, through the cavity in the housing 20 above the part 29, through the nipple 23 to the hose 25 and the vacuum pump. The spring 27 has, in the position shown, some tension causing the ring 30 not to lift if the pressure in the container cavity is not somewhat higher than the pressure above part 29. The ring 30 ensures an efficient tightening in cooperation with the smooth metal surface of the web 17. The rubber will not slide in relation to the metal surface as it is guided. On account of the large diameter of the ring 30 the necessary movement is small, and accordingly the closing-time is short. Part 29 with the ring 30 acts as a valve member and must be in place during milking as it is fastened upon housing 20. The ring 30, the part 29 and the spring 27 may be removable for repair purposes, but in daily use the said members will not be removed. The underside and the topside of the web 17 may be cleaned by wiping. The valve has small vertical dimensions. The housing can replace the usual Y-connection, which in some milking machines is interposed between the vacuum hose and the pulsator and the one-way valve.

In Fig. 3 the numeral 31 designates a cover made of sheet metal and provided with an upwardly projecting flange 32. Within this the sheet 31 is curved upwardly and downwardly to an inner edge defining a central orifice 33 with a diameter of about 2 or 3 millimeters. Within the flange 32 a horizontal shaft 34 is fastened by means of a bearing projections 35. A rubber disc 36 is affixed to the underside of a sheet metal member 37, which is shaped with a bent end-portion 38 enclosing the shaft loosely and having an opening of a width a little smaller than the diameter of the shaft 34. Upon the topside of sheet member 37 is affixed a weight member 39 of a suitable heavy material, for instance steel.

Upon the topside of the flange 32 is disposed a rubber ring 40 and upon this a supporting face of a housing 41, which is provided with a flange 42 surrounding the flange 32. Upon the housing is affixed two hose nipples 43 and 44 having fastened thereto the one end of two hoses 45 and 46. The hose 45 is connected to a pulsator and the hose 46 to a vacuum pump.

The valve shown in Fig. 3 will act mainly as the valve shown in Figs. 1 and 2. The disc 36 will lift against the weight of member 39 by a suitable difference between the pressure below the cover 31 and above the unit constituted by members 36, 37 and 39.

The underside of the rubber disc ensures an efficient tightening in cooperation with the curved smooth surface of the sheet metal 31. The rubber material is suitably guided so that it will not slide in relation to the metal surface, and accordingly will not be worn out. When the device is to be cleaned the unit 36, 37, 39 is swung upwards and backwards so that the sheet 31 may be wiped right to the sharp edge of the orifice. The milking cannot start before the unit 36, 37, 39 is moved into position as shown, nor can the housing be moved into position. On account of the great diameter of the tightening face of disc 36 a slight lifting affords sufficient flow area for the air. The valve will accordingly close and open quickly by variations of the pressure. The unit constituted of the parts 36, 37 and 39 may be removed in the turned back position because the end portion 38 yields about the shaft 34. Such removing is not necessary in daily cleaning.

In Fig. 4 is shown an embodiment adapted for application on existing milking machines. A cover 47 is provided with a substantially conical hollow projection 48 as usual in connection with certain types of pulsators. A housing 49 has its cavity screw threaded below for engagement with a clamping member 50 having exterior screw thread and provided with a conical hole engaging the conical surface of the projection 48. A flange 51 of member 50 clamps the margin of a rubber disc 52 against a shoulder of the housing 49. The parts are so arranged that the rubber disc engages the top edge of projection 48 with no or only slight pre-tension. The rubber disc 52 has an aperture 53 with a diameter of 2 to 3 millimeters. Upon housing 49 is affixed two hose nipples 54 and 55 for hoses 56 and 57. The hose 56 is connected to a pulsator and the hose 57 to a vacuum pump.

The valve acts substantially as the valves already described. By an adequate difference between the pressure below the cover 47 and above the disc 52, the disc will be lifted and air will flow through the bore in the projection 48, under disc 52, through hole 53, through nipple 55 and hose 57 to the vacuum pump. The disc 52 will fit tightly against the top edge of projection 48. The rubber material will not slide upon the metal surface and will, accordingly, not be worn out quickly. On account of the slight weight of disc 52 there is obtained a short closing-time. The valve member must be in place during milking as it is associated with the housing 49.

In the embodiments in Figs. 1–4, there is provided a narrow portion in the air passageway, in Fig. 1 the aperture 6, in Fig. 2 the orifice 18, in Fig. 3 the orifice 33, and in Fig. 4 the aperture 53. By means of such a narrow portion, which has a flow section of about 6 to 10 square millimeters in the embodiments shown, and which must be less than 20 square millimeters, is obtained that only a relatively small air flow can occur, so that by the usual effect of a vacuum pump a suitable vacuum can be maintained in the vacuum system and the teat cups be retained on the teats. This is an important feature in systems for two or more milk containers. The necessary vacuum is about 200 millimeters Hg, but preferably the narrow portion has a flow section of less than 10 square millimeters for maintaining a higher vacuum, for instance about 300 millimeters Hg. Even by a flow area of 4 square millimeters it will only require a few seconds to build up the necessary vacuum in the milk container when starting the milking.

In Fig. 5 a cover 58 has an annular flange 59 and within this a substantially plane horizontal web 60 in which is provided a central hole 61. Upon the web is disposed a rubber disc 62 with four marginal incisions. Projections 63 on the web 60 extend into the said incisions to hold the disc in proper position. Upon the top face of the flange 59 is disposed an annular gasket 64 and upon this a housing 65 with a flange 66 enclosing the flange 59 and provided with an interior downwardly projecting flange 67 having its bottom edge a little above the topside of disc 62. Upon housing 65 is affixed a hose nipple 68 for a hose 69 connected to a vacuum pump. Disc 62 is provided with a little hole 70, but this is not absolutely necessary.

When the pressure below cover 58 is greater than the pressure above disc 62 this disc will be lifted to enable air to flow through hole 61, between disc 62 and the overside of web 60, through cavity of housing 65 and nipple 68 to hose 69 and to the vacuum pump. The disc 62 is ensured against being lifted too much by means of the bottom edge of flange 67. The disc will be closed securely and rapidly, and it is easy to be put into place, and is an inexpensive accessory. It is easy to clean the top side and underside of the web 60, and the hole 61 may be so large, for instance have a diameter of more than 15 millimeters, that it may be cleaned without a brush, but merely by inserting a finger with a piece of fabric through it.

I claim:

1. A milking machine for an air tight milk receiver comprising a removable cover for said receiver and having a valve aperture therein, a valve seat surrounding said aperture, a removable housing arranged over said aperture, sealing means for connecting an annular underside portion of said housing with an annular upperside portion of said cover, said sealing means surrounding said valve seat and providing an air-tight cavity between the housing and the cover, connecting means for a suction hose to communicate with said cavity, said cover, housing and sealing means providing an air-tight passageway from the milk receiver to the suction hose, and a one-way valve member arranged movable relatively to said valve seating to open and close said aperture, said valve member being secured to one of the said members of the said air-tight passageway.

2. A milking machine according to claim 1, in which the valve member is integral with the sealing means.

3. A milking machine according to claim 2, in which the valve member consists of a resilient disc the annular margin part of which constitutes the sealing means, said disc being provided with at least one aperture serving for the air passage and situated between the annular margin part and the part co-acting with the valve seat.

4. A milking machine according to claim 1, in which the valve member has an active valve part consisting of resilient material and secured so that it cannot be laterally displaced when engaging the valve seat.

5. A milking machine according to claim 1, in which the underside and the upperside of the part of the cover enclosing the valve aperture extend at acute angles to a plane perpendicular to the central axis of the valve aperture and meet each other in a substantially sharp edge defining said aperture.

6. A milking machine according to claim 1, in which the annular upperside portion of the cover is provided at such a level relatively to the valve seat that the valve member due to its resilience will be pressed resiliently against said valve seat.

7. A milking machine according to claim 1, in which the said air-tight passageway from the milk receiver to the suction hose comprises at least one restricted portion having a passage area less than 20 square millimeters.

8. A milking machine according to claim 1, in which the said air-tight passageway from the milk receiver to the suction hose comprises at least one restricted portion having a passage area less than 20 square millimeters, and forming the valve aperture itself.

9. A milking machine according to claim 1, in which the said air-tight passageway from the milk receiver to the suction hose comprises at least one restricted portion having a passage area less than 20 square millimeters, and being located in the connecting means for the suction hose.

10. A milking machine according to claim 2, in which the valve member consists of a resilient disc the annular margine part of which constitutes the sealing means, said disc being provided with at least one aperture serving for the air passage and situated between the annular margin part and the part co-acting with the valve seat, the aperture in the disc for the air passage having an area less than 20 square millimeters.

References Cited in the file of this patent

UNITED STATES PATENTS

| | | |
|---|---|---|
| 1,111,562 | Burrell | Sept. 22, 1914 |
| 1,197,288 | Hatfield | Sept. 5, 1916 |
| 1,344,140 | Macartney | June 22, 1920 |
| 1,383,087 | Dunn | June 28, 1921 |
| 1,394,433 | Leitch | Oct. 18, 1921 |
| 1,786,846 | Hodsdon | Dec. 30, 1930 |
| 1,812,086 | Dinesen | June 30, 1931 |
| 1,992,495 | Lynde | Feb. 26, 1935 |
| 2,122,471 | Hulbert | July 5, 1938 |
| 2,404,069 | Hinman | July 16, 1946 |
| 2,581,530 | Harstick | Jan. 8, 1952 |